June 19, 1956 G. E. SMITHBURN 2,750,859
ROTARY TILLER

Filed Jan. 8, 1952 4 Sheets-Sheet 1

INVENTOR.
George E. Smithburn

June 19, 1956  G. E. SMITHBURN  2,750,859
ROTARY TILLER
Filed Jan. 8, 1952  4 Sheets-Sheet 3

INVENTOR.
George E. Smithburn
BY Manfred M. Warren
His Attorney

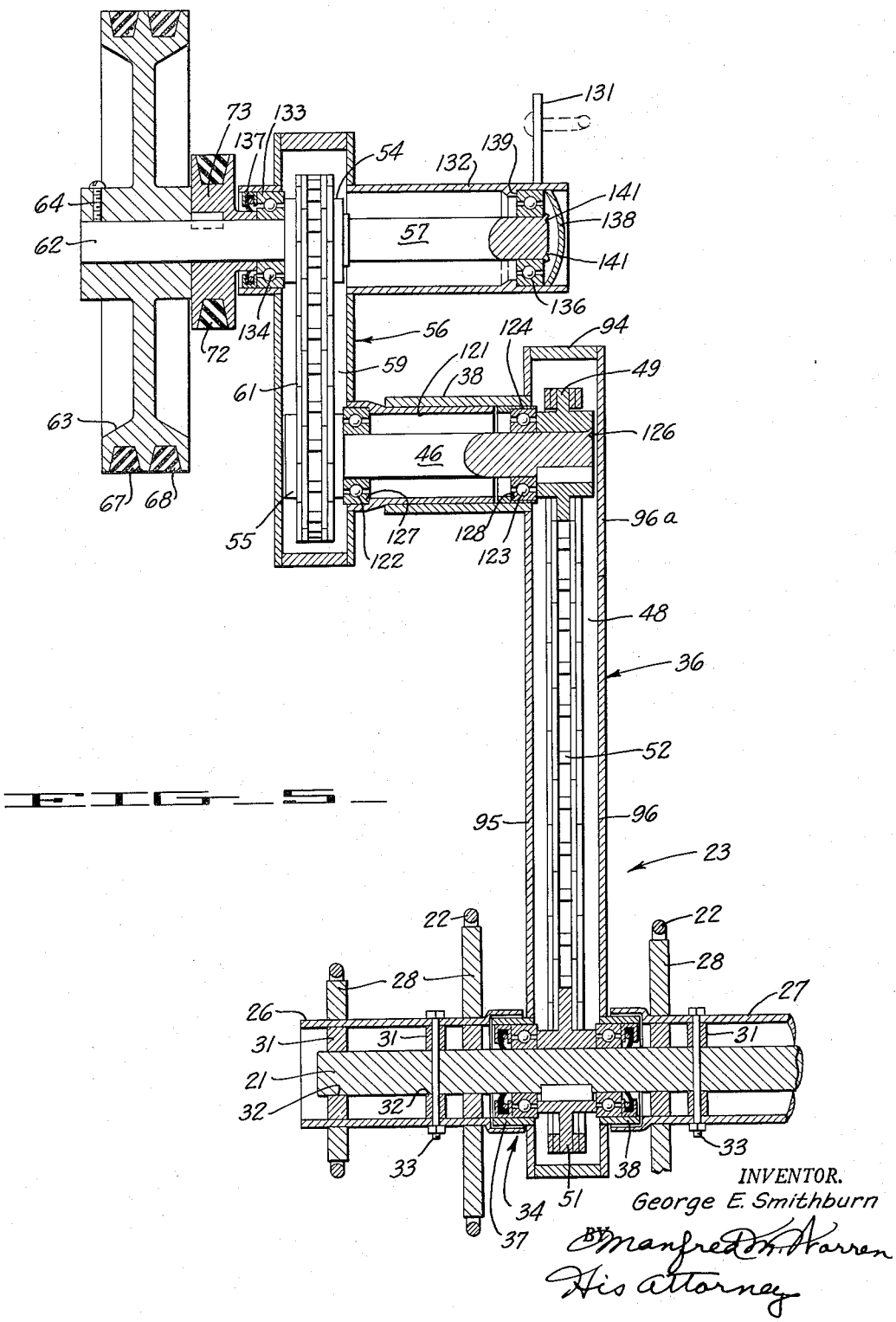

United States Patent Office 2,750,859
Patented June 19, 1956

2,750,859

ROTARY TILLER

George E. Smithburn, Berkeley, Calif.

Application January 8, 1952, Serial No. 265,415

11 Claims. (Cl. 97—40)

The invention relates to earth cultivation means of the so-called rotary tiller type and more particularly to rotary tiller units adapted for use with tractors and the like.

Rotary tillers have heretofore been incorporated generally as an integral part of specially designed and essentially single purpose power driven equipment. Such tillers have also been provided for attachment or addition to the relatively large farm type tractor. There has also evolved in recent years what is commonly referred to as a multi-purpose garden tractor. This tractor is usually equipped with a pair of wheels mounted upon a common transverse axle, appropriately geared to a motor carried on the frame of the tractor. The tractor is also provided with a pair of handlebars for manual engagement by the operator who walks behind the tractor and guides its movement and controls its operation. An example of such garden type tractor is Wards 4 H. P. Plow-Trac garden tractor sold by Montgomery Ward. A variety of implement attachments have been evolved for use with this garden type tractor. These include a plow, lawnmower, disk harrow, hoe cultivator, and others. Insofar as known, however, there has not been prior to this invention a satisfactory or successful attempt to produce a rotary tiller attachment for the garden tractor. The provision of such a unit in a really effective and efficient form which may be readily attached to a garden tractor and which will derive its motive power therefrom, and at the same time have the characteristics of sufficient simplicity and cheapness in manufacture and ease of use which will render it economically feasible and commercially attractive, is a principal object of the present invention.

Another object of the present invention is to provide a rotary tiller unit of the character described which is designed to utilize the full power available from the garden tractor to which it may be attached, and which while of compact width with respect to the relatively wide row-straddling span of the tractor wheels, will nevertheless avoid completely the leaving of a tire track of flattened, pressed down earth on the tilled area.

A further object of the present invention is to provide a rotary tiller attachment for a garden tractor of the character described which incorporates good tracking characteristics affording a straight line normal travel of the tractor, together with easy steering and turning of the unit.

Still another object of the present invention is to provide a rotary tiller attachment of the character above which may be easily and quickly attached to a garden tractor and will afford a rigid and rugged connection thereto and which is readily adjustable to obtain precise alignment of drive pulleys used on the tractor and tiller.

A still further object of the present invention is to provide an improved drive connection for a rotary tiller which may be quickly and easily manipulated to simultaneously control the drive to the tractor wheels and the tiller in order to prevent running away of the tractor under the influence of the rotating tiller when not resisted by the wheels and motor, while at the same time providing for variations in speed and traction power ratios.

Yet another object of the present invention is the provision of a relatively light weight and compact rotary tiller attachment for garden tractors which is constructed of a minimum number of sturdily formed parts designed and coacting to afford a unit which will withstand rugged use over a very long, useful life.

The invention has other objects and features of advantage, some of which, with the foregoing, will be set forth in the following description of the preferred form of the invention which is illustrated in the drawings accompanying and forming part of the specification. It is to be understood, however, that variations in the showing made by said drawings and description may be adopted within the scope of the invention as set forth in the claims.

Referring to said drawings:

Figure 5 is a cross-sectional view on an enlarged scale taken substantially on the plane of line 5—5 of Figure 4.

Figure 6 is a fragmentary bottom perspective view of the attaching means of the tiller.

Figure 1:
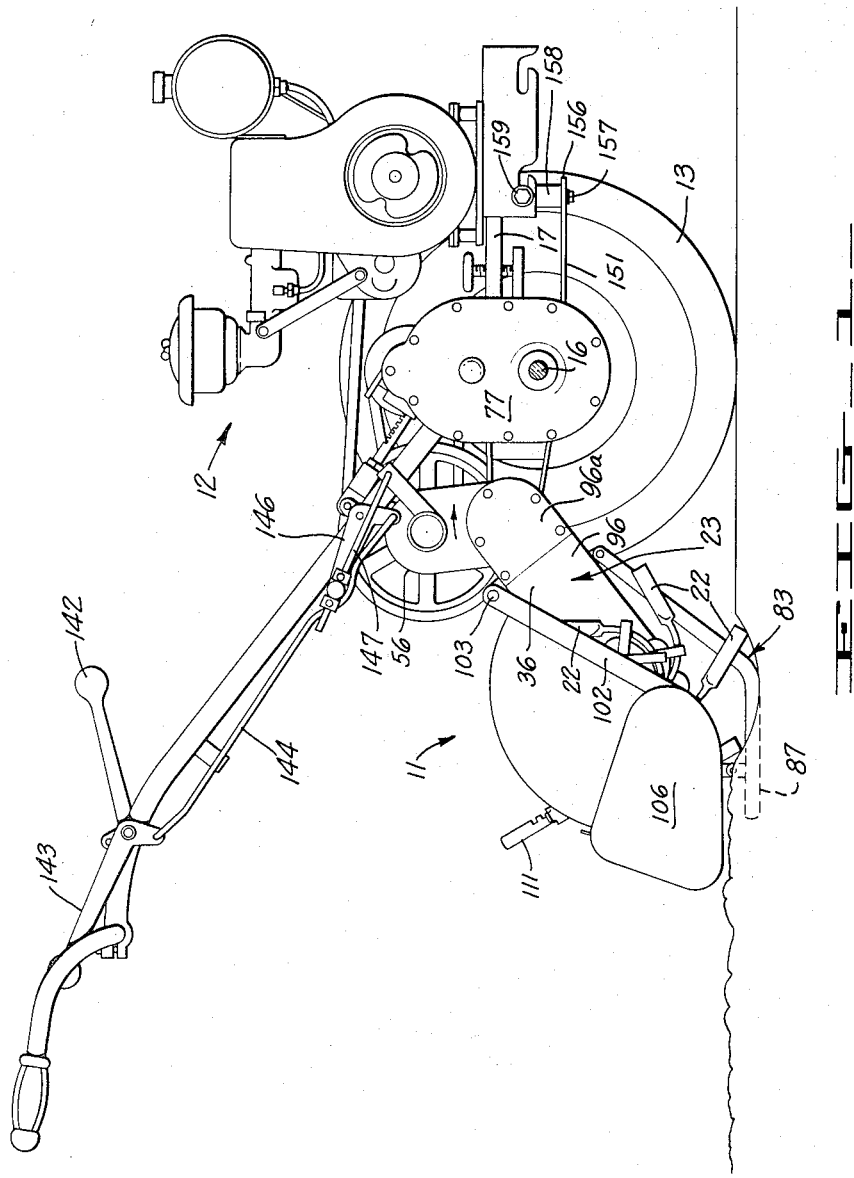
Figure 1 is a side elevational view of a rotary tiller attachment constructed in accordance with the present invention and shown mounted in operating position on a conventional two-wheel garden tractor, the near wheel of the tractor being removed for clarity of illustration.

The cultivator of the present invention and as shown in the accompanying drawings comprises a rotary tiller attachment 11 for a conventional garden tractor 12 of the type having a pair of side by side wheels 13 and 14 mounted upon a common transverse axle means 16 which is in turn supported by a tractor frame 17 on top of which is carried a motor 18 adapted to drive the axle means 16 through a pulley 19 on the motor shaft. The attachment 11 here includes a rotary tiller shaft 21 having a plurality of ground engaging tines 22 secured thereto and projecting therefrom for tilling the earth and means 23 journaling the tiller shaft and adapted for connection to the tractor 12 together with drive means 24 connecting the axle means 16 and the tiller shaft 21 to the tractor motor 18 for rotation thereby with the peripheral speed of the tines 22 exceeding the peripheral speed of the wheels 13 and 14 whereby the tines will develop forward thrust with respect to the tractor.

Figure 3:
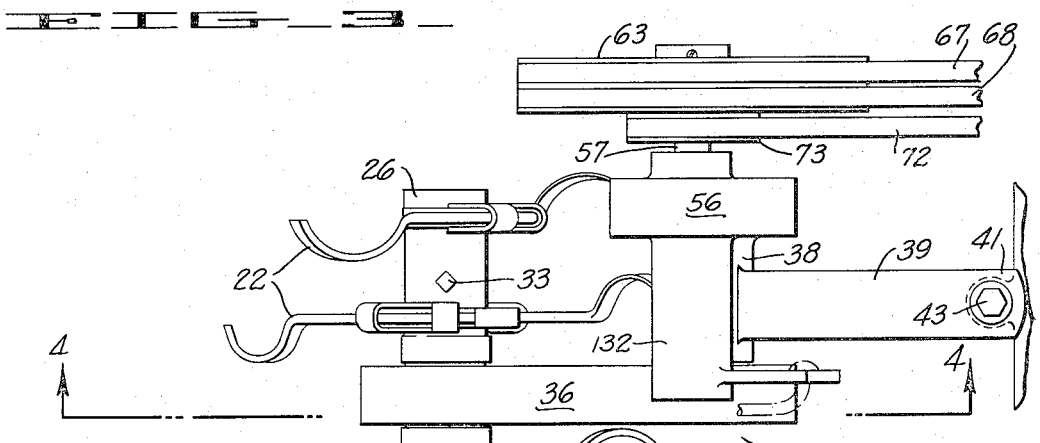
Figure 3 is a plan view on an enlarged scale of the rotary tiller attachment, a hood portion of the device being removed to better illustrate the mechanism.
Figure 4:
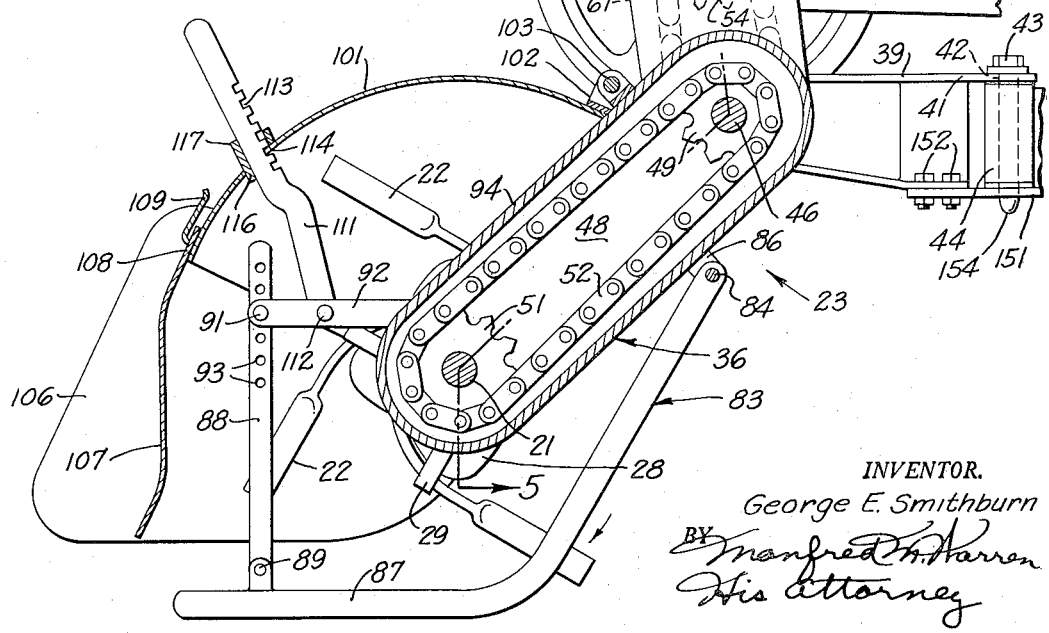
Figure 4 is a cross-sectional view of the rotary tiller attachment and is taken substantially on the plane of line 4—4 of Figure 3.

The tiller shaft 21 and associated tines 22 may take any suitable form but preferably, and as here shown, the tines 22 are of spring construction and are secured to rotatable tube members 26 and 27 by means of mounting plates 28 welded to the tubes and retaining clips 29 secured to the plates 28 as best shown in Figures 3, 4 and 5 of the accompanying drawings. The tiller tubes 26 and 27 are of somewhat larger diameter than the shaft 21 and are provided with internal ring shaped members 31 having a concentric bore 32 fitting over the shaft 21. The tubes are secured to the shaft 21 by means of shear pins 33 which are engaged through aligned bores in the tubes and shaft, see Figure 5.

Attaching means are provided for securing the tiller shaft 21 and associated tines 22 to the tractor frame 17 for movement therewith. As here shown, this means comprises a member 36 of elongated form in which, adjacent one end, the aforementioned tiller shaft 21 is journaled with portions of the shaft extending on opposite sides of the member 36 as best seen in Figures 3 and 5. This journaling is here accomplished by bearing means 34 here illustrated as comprising a pair of ball bearings mounted within tubular extensions 37 and 38 provided on opposite sides of the member 36. As may be seen from Figures 1 and 4 of the accompanying drawings, the member 36 here consists of a hollow oblong chain case or housing. With reference to Figure 5 of the drawing, it will be seen that a second tubular member 38 is secured to the upper end of the chain case 36 and projects laterally therefrom in a generally horizontal direction when the case is in its normally inclined position as shown. This tubular extension 38 is in turn secured to a tiller frame member 39 which extends forwardly to the tractor 12, see Figures 3 and 4. The forward end of the frame 39 is provided with a horizontal plate-like extension 41 in which is provided a bore 42 adapted for engagement by a draw pin 43 normally supplied with the tractor. The draw pin 43 also engages a boss 44 formed on the tractor frame 17, see Figures 4 and 6.

Drive means is provided for transmitting rotative movement from the tractor motor 18 to the tiller shaft 21 to effect rotation of the ground engaging tines 22. As here shown this means includes an intermediate shaft 46 journaled in the chain case 36 and extending therefrom through the tube extension 38 in coaxial relation thereto. Mounted within the hollow interior 48 of the chain case 36 are a pair of cooperating sprockets 49 and 51 keyed to the shaft 46 and the tiller shaft 21 respectively which are engaged with a continuous chain 52 so that rotation of the shaft 46 will be imparted by the chain to the tiller shaft 21. As may be seen from the drawings, the shafts 46 and 21 are disposed parallel to each other and in horizontal relation to the earth. The shaft 46 is journaled within a second and upper chain case 56 at lower end thereof, see Figure 5, and a third shaft 57 is journaled in the upper end in parallel relation to shafts 21 and 46. Cooperating sprockets 54 and 55 are keyed to the shafts 57 and 46 respectively within the interior of 59 of the chain case 56 and a drive chain 61 is entrained about the sprockets 54 and 55 so that rotation of the shaft 57 will be imparted to the shaft 46. The shaft 57 extends horizontally from the chain case 56 and carries at its outer end 62 a pulley wheel 63 which is adapted to be driven by the tractor motor 18. The pulley 63 is secured to the shaft 57 by means of a set screw 64 threaded through the hub 66 of the pulley into engagement with the shaft 57. The pulley 63 may be of any suitable form and is here shown as comprising a double V-belt pulley upon which is engaged a pair of V-belts 67 and 68 (for increasing power transmission) which in turn engage a motor driven pulley 69 provided upon the drive shaft 71 of the motor 18.

Means are provided for driving the axle means 16 to effect rotation of the wheels 13 and 14 and, in accordance with the present invention and as here shown, this drive means includes a belt 72 entrained about a secondary pulley 73 locked to the shaft 57 adjacent to pulley 63. The belt 72 also engages a cone pulley 74 splined on a shaft 76 operatively connected through a gear case 77 to the axle means 16. In this manner it will be seen that rotation imparted to the shaft 57 from the motor 18 through the belt 67 and 68 will in turn be imparted through the belt 72, shaft 76 and gear case 77 to the axle means 16 and thence to the ground engaging wheels 13 and 14. It will be understood that the tractor as shown is a conventional type in which the gear case 77, the shaft 76, and the cone pulley 74 are furnished with the tractor as part of the standard equipment, and the attachment as shown in the drawing is modified to adapt it for use with this particular tractor. It will be understood that various comparatively slight modifications may be made in the drive means attachment to adapt it for use with other tractors of the same type without departing from the spirit of the invention.

As previously mentioned, in order to obtain efficient tilling of the soil it is necessary for the rotary tiller to rotate at a speed much greater than the peripheral speed of the ground engaging wheels. For example, a convenient speed of operation of the tractor with regard to its rate of travel over the ground is in the neighborhood of one of three miles per hour since the operator must of necessity walk along with the tractor.

Depending upon the character of the earth being tilled and the depth of cultivation desired, the tiller, for most efficient use, will be rotated at a peripheral speed of approximately 15 to 20 miles per hour. Because of this faster rotation of the ground engaging tines it is apparent that they will tend to urge the attachment and of course the attached tractor forwardly at a speed considerably in excess of the desired two or three miles per hour.

It is therefore necessary to provide some means for limiting the forward speed of the tractor when used with the tiller so as to provide the desired tilling action of the tines in the earth. In the conventional garden tractor, as here illustrated, the wheels 13 and 14 are provided with a free wheeling or overriding connection to the axle means 16 whereby they are permitted to rotate faster but not slower than the axle. This connection is provided to permit turning of the tractor without interposing a differential mechanism in the axle means. However, if the present tiller were attached to such tractor, the free wheeling connection would permit the tiller to drive the tractor and thus lose the tilling action of the tines in the earth. Accordingly, in applying the tiller attachment to the garden tractor, one of the wheels (here wheel 14) is locked to the axle means 16 and, as an important feature of the present invention, the tiller is located relative to the tractor so that its forward thrust will be resisted by the locked wheel. At the same time the other wheel 13 is permitted to remain in its normally free wheeling connection to the axle means so as to facilitate turning of the tractor by swinging wheel 13 ahead and around the locked wheel 14 which will serve more or less as a pivot point.

In the conventional garden tractor, as illustrated and as above referred to as the Wards Plow-Trac and as manufactured by The Midland Co., South Milwaukee, Wis., as Model #W-3 described in Owners Guide MID 5458-3 published by Montgomery Ward & Co. for Plow-Trac garden tractor, catalogue No. 875,458, instruction book No. 87 Trac-32B, the free wheeling connection of each of the wheels to the axle means is provided by a plurality of pawls carried by the axle and arranged for engagement with ratchet teeth in the hubs of the wheels. Locking the wheels to the axle may be conveniently affected in this construction by merely reversing the position of one of the pawls so as to engage and hold a ratchet tooth in an opposite direction from the holding by one of the other pawls thereby locking the wheel hub to the axle. This specific construction is well known in the art and is therefore not illustrated in the drawings and may be found in the parts and instruction manuals for the tractors as above noted. As may be seen from Figure 2 of the drawings, this locating of the tiller shaft so that the thrust of the tines may be resisted by the locked wheel is accomplished by positioning the tiller shaft in the path of movement of the wheel 14 in such manner that the plane of the wheel intersects the shaft and one or more of the tines 22 are positioned in the wheel track. It has been found that this arrangement will provide a very good tracking of the tractor and attachment so that they will tend to move over the ground in a straight line for easy steering and operation. A further important advantage of the locating of the tiller shaft directly behind the wheel 14 is the fact that this location of the tiller tines serves to break up and loosen the ground after the wheel has passed and the cultivated soil is not thereafter pressed down by the wheel so that a uniform, unmarked strip of tilled earth is left behind the machine.

Depending upon the type of soil encountered and the desired depth of cultivation, a ground engaging member 83 is provided in underlying relation to the chain case 36 with one end of the ground engaging member pivoted to the chain case by means of a pin 84 engaging a bracket 86 on the chain case and the upper end of the member 83. The member 83, as may be best seen in Figure 4, is arranged to extend downwardly and rearwardly from the pivot pin 84 into proximity with the earth, at which point it is bent rearwardly to define a generally horizontal ground engaging portion 87. The depth of penetration of the tiller tines into the earth may be regulated by swinging the ground engaging member 83 about the pivot pin 84 with the realtive distance between the tiller shaft 21 and the portion 87 determining the depth of penetration. Means is provided for determining this spacing and as here shown comprises a vertically disposed link member 88 pivotally connected at its lower end by a pin 89 to the ground engaging member 83 and connected at its upper end by means of pin 91 to a bracket 92 fixedly secured to the chain case 36. A plurality of apertures 93 are provided along the length of the link member 88 for selective engagement by the pin 91 to determine the relative spacing of the member 83 from the tiller shaft 21.

Another feature of the present invention is the provision of a chain case which will have a long life and which is subject to relatively little wearing action and damage by reason of engagement with the earth displaced by the tines 22. With reference to Figure 4, it will be seen that the chain case is constructed from a strap member 94 bent into an elongated O shape and welded together, and side plates 95 and 96 are welded directly to the strap member. As may be seen from Figure 1 of the drawings, the side plate 96 extends over approximately the lower three-fourths of the length of the chain case 36 and a second plate portion 96a is bolted to the chain case. This construction permits assembly of the chain and sprockets on shafts 21 and 46 and filling of the case with oil while providing an integral lower end of the case having no gaskets, protruding bolt heads or nuts which might be worn away by the earth thrown up by the tines 22.

Desirably, and as here shown, a hood 101 is provided in overlying relation to the tiller shaft 21 and associated tines 22. This hood is provided primarily to shield the operator of the tilling machine from flying clods thrown up by the rapidly rotating tines, and is preferably pivotally secured to the tiller attachment in a manner permitting its movement toward and away from the tiller shaft 21 and tines 22 in order to provide access thereto for cleaning, repairing or replacing. As may be seen in Figures 1 and 2 of the drawings, the hood 101 is provided with a yoke member 102 extending about one edge of the hood and secured thereto. The yoke member 102 is pivotally secured by means of a pin 103 to a bracket 104 carried by the chain case 36, and may be swung upwardly and away from the tiller shaft 21 and tines 22 about the pin 103. Suitable side wings 106 are provided secured to the main portion of the hood 101 and a swinging gate-like member 107 is provided at the rear of the hood to permit passage of any large lumps or clods or the like which might be encountered. Preferably this gate member is swingably attached to the hood 101 by means of openings 108 formed in the upper edge of the gate 107 and engaged over flattened hook shaped members 109 secured to the hood 101. As will be apparent, when it is desired to till more deeply, that is to provide deeper penetration of the earth by tiller tines 22, the ground engaging member 83 is moved upwardly relative to the tiller shaft 21 and hence the hood 101 is dropped lower with the result that it might engage the ground and be damaged thereby.

Accordingly, means is provided for adjusting the spacing of the hood relative to the tiller shaft 21. As here shown, this means includes a notched bar 111 pivotally attached by means of a pin 112 to the bracket 92 with the notches 113 arranged at the forward edge thereof for engagement by the edge 114 of an opening 116 in the hood 101, see Figure 4. Engagement of the notches 113 provided in the rod 111 with the edge 114 of hood 101 is here accomplished by a wedge member 117 slideably encircling the member 111 and proportioned to fit within the opening 116 for urging the notches forwardly against the cooperating edge 114.

As an important feature of the invention, means is provided for establishing and breaking the drive connection between the driven shaft 57 and the motor shaft 71 and between the driven shaft 57 and the axle means drive shaft 76. This establishing and breaking of the drive connection is here accomplished by moving the pulley 63 toward and away from the motor driven pulley 69. As here shown, this relative movement of the pulleys together and apart is accomplished by providing a pivotal mounting of the chain case 56 adjacent its lower end so that the driven shaft 57 may be swung about this pivot point away from the motor shaft 71 to tighten the belts 67 and 68 about the pulleys 63 and 69, and, conversely, to permit swinging of the shaft 57 toward the motor shaft 71 to loosen the belt 67 and 68 about the pulleys 63 and 69 so that the operating drive connection provided thereby may be broken. With reference to Figure 5 of the drawings, it may be seen that the tubular extension 38, provided on the lower chain case 36, which is, of course, connected to the attachment frame 39, is adapted to journal therewithin a mating tubular extension 121 secured to the chain case 56 in coaxial relation to the shaft 46. As previously mentioned, the shaft 46 is journaled by the chain cases 36 and 56 and, as shown in Figure 5, this journaling is accomplished by means of ball bearings 122 and 123 mounted on the shaft 46, with the ball bearing 122 being engaged at its periphery by the tubular member 121 and with the ball bearing 123 engaged at its periphery by a diametrically constricted portion 124 of the tubular member 38. The shaft 46 is retained in place and against endwise movement by means of the engagement of the hub portions of the brackets 49 and 54 with the adjacent ball bearings, the hub portions in turn being held in place by peening over of the end of the shaft 46 as indicated at 126. In this manner the sprockets 49 and 54 are held on the shaft from movement away from each other and the ball bearings 122 and 123 are clamped between the hub portions of the sprockets and opposed shoulder portions 127 and 128 provided on the tubular members 121 and 124 respectively. Actuation of the chain case 56, for movement about the bearing provided by the tubular member 38, is accomplished through a bracket arm 131 secured to a tubular extension 132 of the chain case 56, the tubular extension 132 being disposed concentrically with the shaft 57. A second tubular case extension 133 is mounted on the opposite side of the chain case 56 and is coaxially aligned with the extension 132. As may be seen from Figure 5 of the drawing, the aforementioned journaling of the shaft 57 in the chain case 56 is accomplished by means of ball bearings 134 and 136 mounted between the shaft 57 and the tubular members 132 and 133. Suitable oil seals 137 and 138 are provided, with the seal 137 being of the conventional spring loaded leather washer type pressed into the tubular member 133 with the leather washer engaging the hub of the pulley 73, while the oil seal 138 is of the concavoconvex type which may be inserted within the bore of the tubular member 132 and then hammered into place to position the ball bearing 136 between the seal 138 and an internal shoulder 139 formed on the interior surface of the member 133. The shaft 57 is retained in place against endwise displacement by means of peening over the shaft at 141.

Any suitable means may be employed for effecting the above described pivotal movement of the chain case 56 and the shaft 57 about the axis of the shaft 46. However, in the particular form of tractor shown in the accompanying drawings and previously described, manually operable levers 142 and 143 are mounted on the tractor adjacent its steering handles 81 and 82 for convenient manual operation by the operator of the tractor and these levers are connected in turn to control rods 140 and 144. As here shown, the control rod 140 is attached to the shaft 76 but is left in one position and serves no function when the tractor is used with the attachment of the present invention. The control rod 144, however, is attached to an associated bell crank 146 provided on the tractor and a suitable connecting rod 147 connects the crank 146 to the distal end of the bracket arm 131. As may be best seen from Figures 1 and 2, when the lever 143 is pulled back to the position shown, the rod 144 is pushed forwardly actuating the bell crank to draw back the link 147 and thus swing the chain case 56 rearwardly to the position shown. In this position, the belts 67 and 68 will be placed under tension around the pulleys 63 and 69 thus establishing an operative connection between the motor and the shaft 57 for rotating of the latter. Rotation of this shaft 57 will of course rotate the tiller shaft 21 through the associated chain and sprocket drive and will also rotate the tractor wheels 13 and 14 through the belt 72 connected with the axle means 16. Movement of the lever 143 forwardly into a position similar to that shown for lever 142 will urge the control rod 144 rearwardly operating the belt crank 146 to push the link 147 and hence the chain case 56 forwardly to shorten the distance between the pulleys 63 and 69 thus loosening the belts 67 and 68 and breaking the operative connection therebetween. At the same time, of course, the pulley 73 will move toward the pulley 74 by reason of the mounting of the pulley 73 upon the shaft 57 thus loosening the belt 72 and breaking the operative connection between the tiller shaft 21 and the axle means 16.

Another feature in the present construction is the utilization of the counter-torque which is present on chain case 56 and acting around its axis of rotation (shaft 46) to swing the chain case 56 in a belt tightening direction. With the usual gasoline engine standard with the garden tractor as here illustrated, it is desirable to effect a speed reduction from the motor shaft to the tiller shaft. Part of this gear reduction may be conveniently taken in the belt drive by arranging pulley 63 of greater diameter than the motor drive pulley 69. The balance of the reduction, approximately two to one, is, in the present construction, taken up in the two chain cases 56 and 36 with the gear reduction (obtained by sprocket sizes) approximately evenly divided between the two cases. If too great a gear reduction is taken in the upper chain case 56, the counter-torque, being greater with the greater gear reduction, would present too great a strain on the belt tightening structure. The arrangement illustrated and above described, however, provides a desirable automatic swinging of the upper case 56 in a belt tightening direction so as to assist manual operation, while at the same time not imposing too great a strain upon the manually operated belt tightening structure above described.

It will be appreciated that any misalignment of the pulleys 63 and 69 will result in excessive wearing of the belts 67 and 68. Accordingly, and as an important feature of the present invention, improved means is provided as part of the attaching means for effecting precise alignment of these pulleys. Alignment of the pulleys into parallel planes is here accomplished by rotating the attachment 11 about the previously described draw pin 43. This rotation is effected by providing an extension on the frame 39 in the form of a torque bar 151. As here shown, the torque bar 151 is fixedly secured to the attachment frame 39 by means of bolts 152 and is further provided with an opening 153 engageable over the lower end 154 of the draw pin 43. As will be apparent from Figures 1, 4 and 6, movement of the distal end 156 of the torque bar 151 in an arcuate path about the draw pin 43 will, in turn, swing the attachment frame 39 about the draw pin so as to bring the pulley 63 into parallelism with the pulley 69. Precise adjustment of end 156 of the torque bar 151 relative to the tractor frame 17 is here accomplished by means of a bolt 157 engaged with the end 156 and secured to a bracket member 158 which is, in turn, bolted to the tractor frame by means of a bolt 159. In order to provide a variety of positions for fine adjustment of the torque bar a series of holes 161 are provided transversely on the torque bar 151 and a mating series of holes 162 are provided in the bracket 158 with the spacing of the holes 161 being dissimilar to the spacing of the holes 162.

In attaching the rotary tiller attachment to the conventional garden tractor, the draw pin 43 is first removed from the boss 44 on the tractor frame 17 and the portion 42 of the attachment frame 39 is placed on top of the boss 44 and aligned with the hole therethrough and the pin 43 is dropped into place. The torque bar 151 is then engaged over the lower end 154 of the draw pin and is secured to the attachment frame 39 by means of the bolts 152. The outer end 156 of the torque bar is then moved back and forth until the pulley 63 is in parallel relation to the pulley 69 whereupon the bolt 157 is engaged in the appropriate holes 161 and 162 to hold the attachment in rigid alignment with the tractor frame. As may be seen from Figure 5 of the accompanying drawings, pulley 63 may then be moved along the shaft 57 as required to bring the pulleys into precise coplanar alignment or the pulley 69 may be moved back and forth along the motor shaft 71 to accomplish the same result. Similarly the pulley 74 may be moved back and forth along the shaft 76 to bring the desired step of the cone pulley 74 into alignment with the pulley 73 to effect the desired drive ratio between the shaft 57 and the shaft 76. After the pulleys have been aligned, the belts 67 and 68 are slipped into place while the handle 143 is in forward position and at the same time the belt 72 is engaged over the pulleys 73 and 74. The handle 143 is then pulled back to the rearward position shown to tighten the belts 67 and 68 as described above. With the tiller attachment applied as described and shown in the drawing, the weight distribution on opposite sides of the tractor wheels 13 and 14 is such that the assembly will naturally rock back with the tiller attachment firmly placed on the ground to be tilled. The ground engaging member 83 is then in position to determine the depth of penetration of the tines into the earth and the link member 88 and the hood 101 are adjusted accordingly. At this point the tractor and attachment is ready for use.

Figure 2:
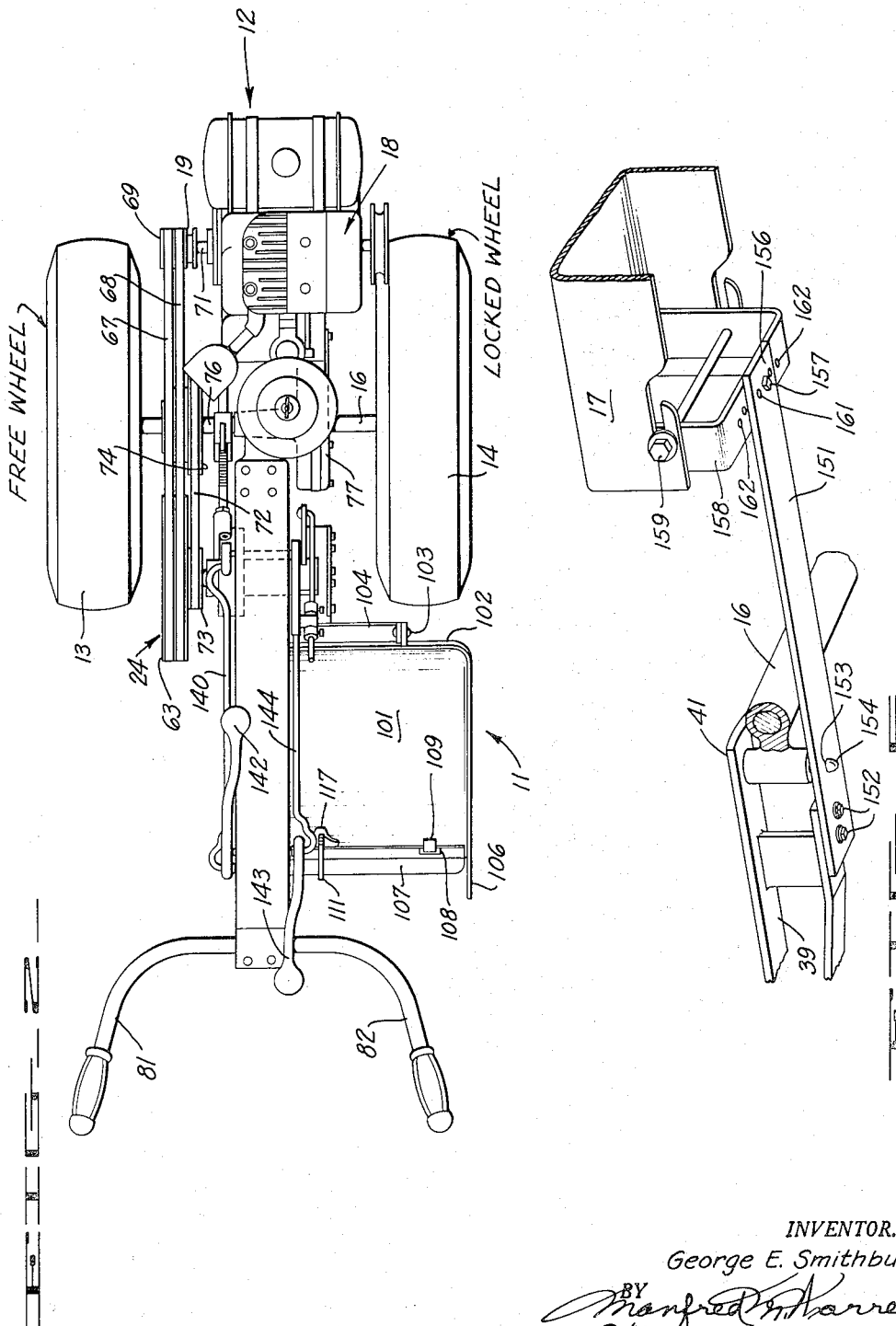
Figure 2 is a plan view of the rotary tiller attachment and tractor illustrated in Figure 1.

In the operation of the rotary tiller of the present invention, the tractor motor is first started and is preferably advanced to full throttle to obtain maximum power, and the operating lever 143 is then pulled back to the position shown in Figures 1 and 2 of the drawing. This will swing the chain case 56 and shaft 57 rearwardly, thus increasing the space between the pulleys 63 and 69 and tightening the belts 67, 68, and 72. This tightening of the belts will, as previously described, effect a simultaneous operative connection between the motor and the tiller shaft and axle means. The tractor, together with the attachment, will then move under its own power across the field in a substantially straight line with a minimum of steering by the operator. When the end of the row is reached, the tractor and attachment as shown may be turned around the wheel 14 for the return trip. When the pawl and ratchet connection of the left wheel 13 (as viewed in plan) is not changed, but is left as above described, upon addition of the tiller attachment, the normal turning of the tractor and tiller would be in a clockwise direction around the locked wheel 14 serving as a pivot. However, I have found that equal if not superior results are obtained by entirely disconnecting the drive from the axle 16 to the left wheel 13, such as by removing all of the pawls, thus rendering wheel 13 completely free wheeling. In such case the tractor and tiller attachment may be readily turned in either a clockwise or a counter-clockwise direction around wheel 14. Accordingly, the term free wheeling, as herein used, shall be taken to include a connection of wheel 13 to its axle wherein the wheel is permitted to turn faster, but not slower, than the axle in an overriding type of connection, or where the wheel is free of any driving connection to the shaft and is permitted to freely rotate about the shaft in either direction.

At the end of the row, or at any other time, that it is desired to halt tilling operations, it is only necessary to displace the lever 143 forwardly and the chain case 56 will swing to a forward position loosening the drive belts and thus simultaneously disconnecting the tiller and wheels from the motor while the connection between the tiller and the wheels will be broken at the same time so that they may move independently. It will be apparent from the drawings and the foregoing description that I have provided a new and improved attachment for garden tractors which utilizes a rotary tiller and which possesses improved tracking, cultivating and safety features and which at the same time is of light weight, sturdy construction and is extremely efficient and easy to operate.

I claim:

1. A cultivator comprising, a tractor having a motor and transverse axle means driven thereby and first and second ground engaging wheels carried by said axle means in locked and free wheeling connection thereto respectively, a tiller attachment for said tractor including a shaft having ground engaging tines secured thereto and projecting therefrom for tilling the earth, means connecting said axle means and said tiller shaft to said motor for rotation thereby with the peripheral speed of said tines exceeding the peripheral speed of said wheels whereby said tines will develop forward thrust with respect to said tractor, and means connecting said attachment and tractor and locating said tiller shaft in line with said first wheel and laterally offset from said second wheel so that said thrust will be resisted by said first named wheel.

2. A cultivator comprising, a tractor having a motor and transverse axle means driven thereby and first and second ground engaging wheels carried by said axle means in locked and free wheeling connection thereto respectively, a tiller attachment for said tractor including a shaft having ground engaging tines secured thereto and projecting therefrom for tilling the earth, means connecting said attachment to said tractor with said shaft parallel to said axle means and with the plane of said first named wheel intersecting said shaft and with the plane of said second wheel laterally offset from said shaft, and means connecting said axle means and said tiller shaft to said motor for rotation thereby with the peripheral speed of said tines exceeding the peripheral speed of said wheels whereby said tines will develop forward thrust resisted by said first named wheel.

3. A cultivator comprising, a tractor having a motor and transverse axle means driven thereby and first and second ground engaging wheels carried by said axle means in locked and free wheeling connection thereto respectively, a tiller attachment for said tractor including a shaft having ground engaging tines secured thereto and projecting therefrom for tilling the earth, means connecting said attachment to said tractor with said shaft substantially parallel to and to the rear of said axle means and with at least one of said tines positioned in the path of movement of said first named wheel and with said shaft laterally offset from said second wheel, and means connecting said axle means and said tiller shaft to said motor for rotation thereby with the peripheral speed of said tines exceeding the peripheral speed of said wheels whereby said tines will develop forward thrust resisted by said first named wheel.

4. A cultivator comprising, a tractor having a motor and transverse axle means driven thereby and first and second ground engaging wheels carried by said axle means in locked and free wheeling connection thereto respectively, a attachment for said tractor including a tiller shaft having ground engaging tines secured thereto and projecting therefrom for tilling the earth, means connecting said attachment to said tractor behind said first named wheel and laterally offset from said second named wheel with said shaft parallel to said axle means and with the plane of said first named wheel intersecting said shaft so that at least one of said tines is positioned in the path of movement of said first named wheel, and means connecting said axle means and said tiller shaft to said motor for rotation thereby with the peripheral speed of said tines exceeding the peripheral speed of said wheels whereby said tines will develop forward thrust resisted by said first named wheel.

5. A cultivator comprising, a tractor having a motor and transverse axle means driven thereby and first and second ground engaging wheels carried by said axle means in locked and free wheeling connection thereto respectively, a tiller attachment for said tractor located in line with said first named wheel and laterally offset from said second named wheel and having an elongated chain case having drive and driven shafts journaled for rotation adjacent the opposite ends thereof and chain sprocket drive means within said case connecting said shafts, said driven shaft having end portions extending from the opposite sides of said case, ground engaging tines secured to and projecting from each of said driven shaft end portions, said attachment being positioned with said driven shaft parallel to said axle means and with one of said end portions lying in the plane of said first named wheel, and drive means connecting said drive shaft to said motor and said axle means and arranged to provide a peripheral speed of said tines exceeding the peripheral speed of said axle means whereby said tines will develop forward thrust resisted by said first named wheel.

6. A cultivator for a tractor having a motor and transverse axle means and ground engaging wheels mounted on said axle means for rotation thereby, comprising, a housing having drive and driven shafts journaled for rotation therein and drive means connecting said shafts, means connecting said housing to said tractor with said driven shaft parallel to said axle means, ground engaging tines secured to and projecting from said driven shaft, a second housing pivotally mounted for swinging movement about the axis of said drive shaft, a third shaft journaled for rotation in said second housing, drive means connecting said third shaft with said drive shaft, and drive means energized upon selective pivotal displacement of said second housing for operatively connecting said third shaft to said motor and said axle means.

7. A cultivator for a tractor having a motor and ground engaging wheels mounted on transverse axle means for rotation thereby comprising, a housing, a tiller shaft journaled for rotation in said housing, means for attaching said housing to said tractor with said tiller shaft in parallel relation to said axle means, said tiller shaft having end portions extending from opposite sides of said housing, ground engaging tines secured to and extending from each of said tiller shaft end portions, a second shaft journaled for rotation in said housing in spaced parallel relation to said tiller shaft, chain and sprocket means within said housing connecting said tiller shaft to second shaft for rotation thereby, a second housing pivotally mounted for swinging movements into angularly spaced positions about the axis of said second shaft, a third shaft journaled for rotation in said second housing in parallel spaced relation to said second shaft, chain and sprocket means within said second housing connecting said second shaft to said third shaft for rotation thereby, and drive means engaging said third shaft for operative connection thereof to said motor and said axle means when in one of said positions and for breaking said operative connection when in the other of said positions whereby movement of said second housing into one position will effect simultaneous rotation of said tiller shaft and said axle means by said motor and movement of said second housing into said other position will disconnect said tiller shaft and said axle means from said motor.

8. A cultivator for a tractor having a motor and transverse axle means and ground engaging wheels mounted on said axle means for rotation thereby, comprising, an elongated housing having drive and driven shafts journaled for rotation adjacent the opposite ends thereof and drive means connecting said shafts, means connecting said housing to said tractor with said driven shaft parallel to said axle means, ground engaging tines secured to and projecting from said driven shaft, a second elongated housing pivotally mounted adjacent one end for swinging movement about the axis of said drive shaft, a third shaft journaled for rotation adjacent to the opposite end of said second housing, drive means connecting said third shaft with said drive shaft, and belt and pulley drive means energized upon selective pivotal displacement of said second housing for operatively connecting said third shaft to said motor and said axle means.

9. A cultivator comprising, a tractor having a motor and transverse axle means and ground engaging wheels mounted on said axle means for rotation thereby, an elongated housing having drive and driven shafts journaled for rotation adjacent the opposite ends thereof and drive means connecting said shafts, means connecting said housing to said tractor with said driven shaft parallel to said axle means, ground engaging tines secured to and projecting from said driven shaft, a second elongated housing pivotally mounted adjacent one end for swinging movement about the axis of said drive shaft, a third shaft journaled for rotation adjacent to the opposite end of said second housing, drive means connecting said third shaft with said drive shaft, belt and pulley drive means energized upon selective pivotal displacement of said second housing for operatively connecting said third shaft to said motor and said axle means, and manually engageable and displaceable means carried by said tractor and connected to said second housing for effecting pivotal displacement thereof.

10. A cultivator for a tractor having a frame and a motor and transverse axle means mounted thereon and ground engaging wheels carried by said axle means and a motor driven pulley arranged in a vertical plane of rotation perpendicular to the axis of said axle means and a vertically disposed pin carried by said frame for attaching various implements to the tractor, comprising, a tiller shaft having ground engaging tines secured thereto and projecting therefrom, a drive shaft fitted with a drive pulley and having a drive connection to said tiller shaft, frame means journaling said shafts for rotation in parallel relation and formed with a bearing portion engageable with said pin for locating said shafts horizontally and said drive pulley in a vertical plane, an elongated extension for said frame means projecting therefrom into juxtaposition with a portion of said tractor frame, means securing said extension to said tractor frame portion at various transverse positions of the former whereby said frame means may be swung about said pin as a pivot to orient said drive shaft pulley into precise parallelism with said motor driven pulley and then locked in such position, and a belt for connecting said pulleys.

11. A cultivator for a tractor having a frame with a motor and transverse axle means mounted thereon and a pair of ground engaging wheels carried by said axle means together with a vertically disposed pin carried by said frame for attaching various implements to the tractor, said tractor also being furnished with a pulley on said axle means arranged in a vertical plane of rotation perpendicular to the axis thereof and a motor driven pulley parallel to said axle pulley, comprising; a tiller shaft having ground engaging tines secured thereto and projecting therefrom; a drive shaft fitted with a pair of drive pulleys and having a drive connection to said tiller shaft, frame means journaling said shafts for rotation in parallel relation and formed with a bearing portion engageable with said pin for locating said shafts horizontally with said drive pulleys in parallel vertical planes and generally in line with and to one side of said motor and axle pulleys, an elongated extension for said frame means projecting therefrom into juxtaposition with a portion of said tractor frame, means for securing said extension to said tractor frame portion at various transverse positions of the former whereby said frame means may be swung about said pin as a pivot to orient said drive shaft pulleys into precise parallelism with said motor pulley and said axle pulley and then locked in such position, belt means carried by said drive pulleys and adapted for operative engagement with said motor pulley and said axle pulley, and means for selectively displacing said drive shaft in a vertical plane parallel to said planes of said drive pulleys so as to maintain said parallelism and away from and toward said motor and axle pulleys for simultaneously establishing and breaking respectively said operative connection between said pulleys.

References Cited in the file of this patent

UNITED STATES PATENTS

| | | |
|---|---|---|
| 1,559,276 | Nelson | Oct. 27, 1925 |
| 1,878,442 | Hamshaw | Sept. 20, 1932 |
| 2,015,587 | Bready | Sept. 24, 1935 |
| 2,070,288 | Mack | Feb. 9, 1937 |
| 2,176,261 | Kelsey | Oct. 17, 1939 |
| 2,207,447 | Viles et al. | July 9, 1940 |
| 2,260,344 | Shaw | Oct. 28, 1941 |
| 2,368,290 | Donald | Jan. 30, 1945 |
| 2,450,749 | Clark | Oct. 5, 1948 |
| 2,491,892 | Claus | Dec. 20, 1949 |
| 2,558,822 | Claus | July 3, 1951 |
| 2,595,854 | Howard | May 6, 1952 |
| 2,598,768 | Donald | June 3, 1952 |
| 2,614,474 | Merry | Oct. 21, 1952 |
| 2,632,518 | Pross | Mar. 24, 1953 |
| 2,633,789 | Ober | Apr. 7, 1953 |

FOREIGN PATENTS

| | | |
|---|---|---|
| 123,521 | Sweden | Dec. 7, 1948 |